US010371288B1

United States Patent
Critsinelis et al.

(10) Patent No.: US 10,371,288 B1
(45) Date of Patent: Aug. 6, 2019

(54) APPARATUS AND METHOD FOR REDUCING IMPACT OF STRESSES ON A SUBSEA PIPELINE

(71) Applicant: Chevron U.S.A. Inc., San Ramon, CA (US)

(72) Inventors: Antonio Critsinelis, Kingwood, TX (US); Sid A. Mebarkia, Sugar Land, TX (US); Kale Z. Lundeen, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/166,613

(22) Filed: Oct. 22, 2018

(51) Int. Cl.
*F16L 1/24* (2006.01)
*F16L 3/16* (2006.01)
*F16L 1/12* (2006.01)
*E21B 43/01* (2006.01)

(52) U.S. Cl.
CPC ............ *F16L 1/24* (2013.01); *E21B 43/0107* (2013.01); *F16L 1/123* (2013.01); *F16L 3/16* (2013.01)

(58) Field of Classification Search
CPC ..... F16L 1/24; F16L 1/123; F16L 3/16; E21B 43/0107
See application file for complete search history.

(56) References Cited

U.S. PATENT DOCUMENTS

| | | |
|---|---|---|
| 320,771 A | 6/1885 | Ford |
| 924,262 A | 6/1909 | Moll |
| 1,079,758 A | 11/1913 | Gray |
| 1,574,211 A | 2/1926 | Taylor |
| 1,928,570 A | 9/1933 | Mustico |
| 2,749,155 A | 6/1956 | Kinghorn et al. |
| 2,770,475 A | 11/1956 | Rafferty |
| 2,900,795 A | 8/1959 | Brandt |
| 2,928,411 A | 3/1960 | Johnson |
| 3,313,358 A | 4/1967 | Postlewaite et al. |
| 3,379,027 A | 4/1968 | Mowell et al. |
| 3,603,617 A | 9/1971 | Lochridge |
| 3,734,138 A | 5/1973 | Brown et al. |
| 3,768,269 A | 10/1973 | Broussard et al. |
| 3,781,041 A | 12/1973 | Petzetakis |
| 3,916,500 A | 11/1975 | Brown |
| 3,961,490 A | 6/1976 | Corgnet |
| 4,088,089 A | 5/1978 | Flory |
| 4,128,219 A | 12/1978 | Kaigler, Jr. et al. |
| 4,234,216 A | 11/1980 | Swanson et al. |
| 4,418,947 A | 12/1983 | Talafuse |

(Continued)

*Primary Examiner* — Benjamin F Fiorello
(74) *Attorney, Agent, or Firm* — Karen R. DiDomenicis

(57) ABSTRACT

Disclosed are an apparatus and method for supporting a portion of a pipeline for conveying produced fluids in a subsea environment to facilitate movement of the portion of the pipeline over a seabed in response to stresses on the pipeline. The portion of the pipeline is supported on a rigid support structure having rotatable components that rotate about an axle attached to the rigid support structure such that the rigid support structure and the portion of the pipeline can move over the seabed. The apparatus and method eliminate the need for costly mud mats or suction piles to accommodate movement in the subsea pipeline and prevent pipeline walking. By facilitating movement of the portion of the pipeline, lateral deformation and axial displacement of the portion of the pipeline can be reduced or eliminated.

18 Claims, 5 Drawing Sheets

(56) References Cited

U.S. PATENT DOCUMENTS

| | | |
|---|---|---|
| 4,694,865 A | 9/1987 | Tauschmann |
| 5,018,903 A | 5/1991 | O'Donnell et al. |
| 5,518,340 A | 5/1996 | Hall et al. |
| 5,575,590 A | 11/1996 | Drost et al. |
| 5,711,639 A | 1/1998 | Tessier et al. |
| 5,722,340 A | 3/1998 | Sweetman |
| 6,004,072 A | 12/1999 | Cunningham |
| 6,171,025 B1 | 1/2001 | Langner et al. |
| 6,213,157 B1 | 4/2001 | Thiebaud et al. |
| 6,270,387 B1 | 8/2001 | Nesheim |
| 6,312,193 B1 * | 11/2001 | Witting .............. E21B 43/0135 405/169 |
| 6,315,006 B1 | 11/2001 | Opperthauser |
| 6,450,736 B1 | 9/2002 | Eck et al. |
| 6,461,140 B1 | 10/2002 | Bosg et al. |
| 6,513,551 B2 | 2/2003 | Louis et al. |
| 6,817,808 B1 | 11/2004 | Patinet |
| 7,121,767 B1 | 10/2006 | Watkins |
| 7,214,114 B2 | 5/2007 | Gibson |
| 7,578,315 B2 | 8/2009 | Wilson |
| 7,660,496 B2 | 2/2010 | Roberts |
| 7,744,314 B2 | 6/2010 | Eide |
| 7,819,608 B2 | 10/2010 | Joshi et al. |
| 8,408,842 B2 * | 4/2013 | Cafaro ................ E21B 43/013 405/169 |
| 8,628,272 B2 * | 1/2014 | Alliot ...................... F16L 1/16 405/170 |
| 8,721,222 B2 | 5/2014 | Mebarkia et al. |
| 8,882,389 B2 * | 11/2014 | Bastesen .................. F16L 1/20 405/169 |
| 8,950,979 B2 * | 2/2015 | Hassel ..................... F16L 1/20 405/169 |
| 9,709,191 B2 * | 7/2017 | Brunet ..................... F16L 1/20 |
| 9,890,876 B2 * | 2/2018 | Sapsay ..................... F16L 3/20 |
| 2002/0023782 A1 | 2/2002 | Appleton et al. |
| 2003/0068941 A1 | 4/2003 | Oram |
| 2005/0047871 A1 | 3/2005 | Lee et al. |
| 2005/0141967 A1 | 6/2005 | Giles et al. |
| 2006/0045408 A1 | 3/2006 | Jones et al. |
| 2006/0210361 A1 | 9/2006 | Lamison |
| 2008/0274656 A1 | 11/2008 | Routeau et al. |
| 2009/0185868 A1 | 7/2009 | Masters et al. |
| 2009/0313794 A1 | 12/2009 | Denniel et al. |
| 2014/0273677 A1 * | 9/2014 | Critsinelis .............. B63B 22/00 441/11 |

* cited by examiner

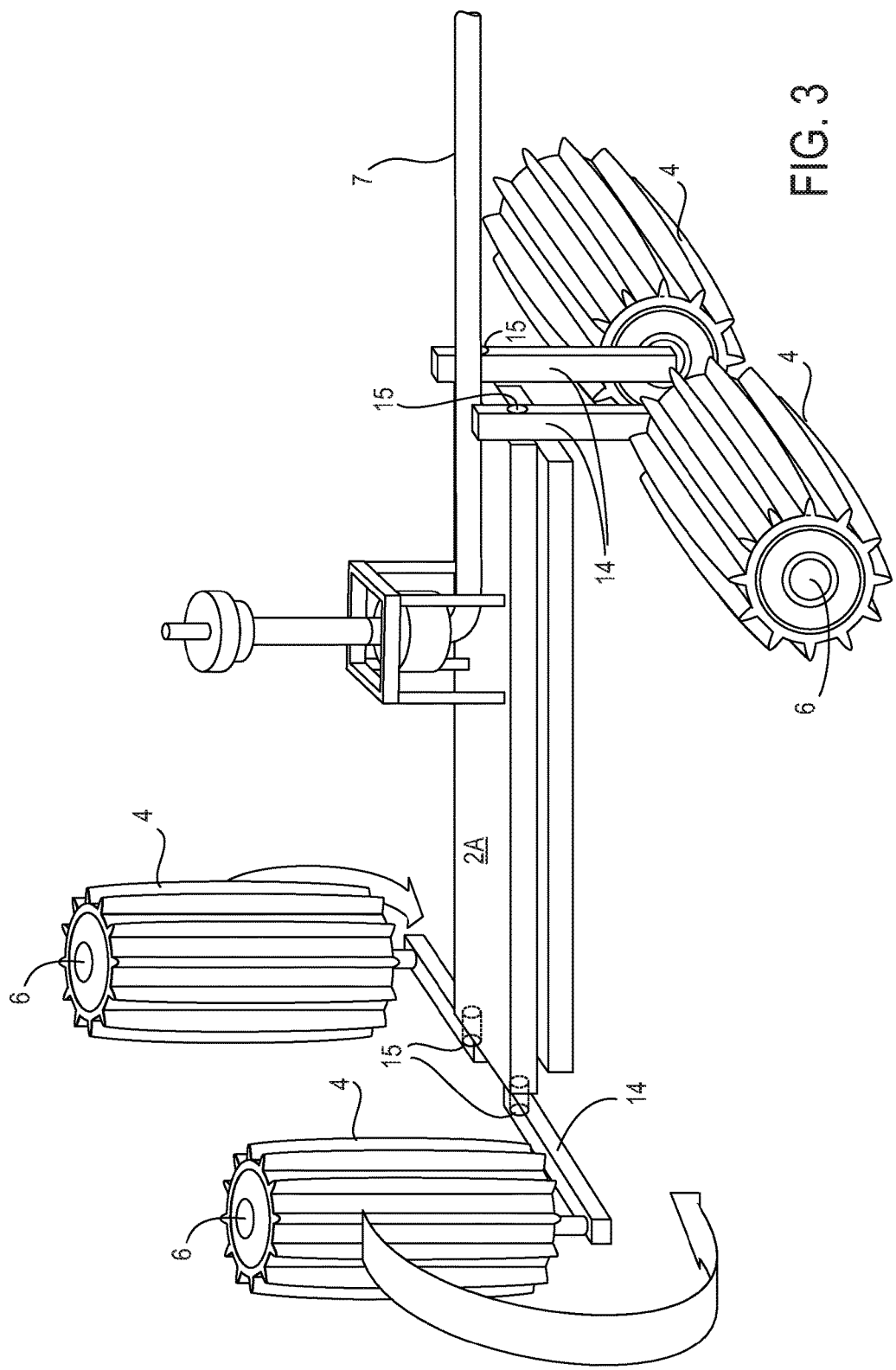

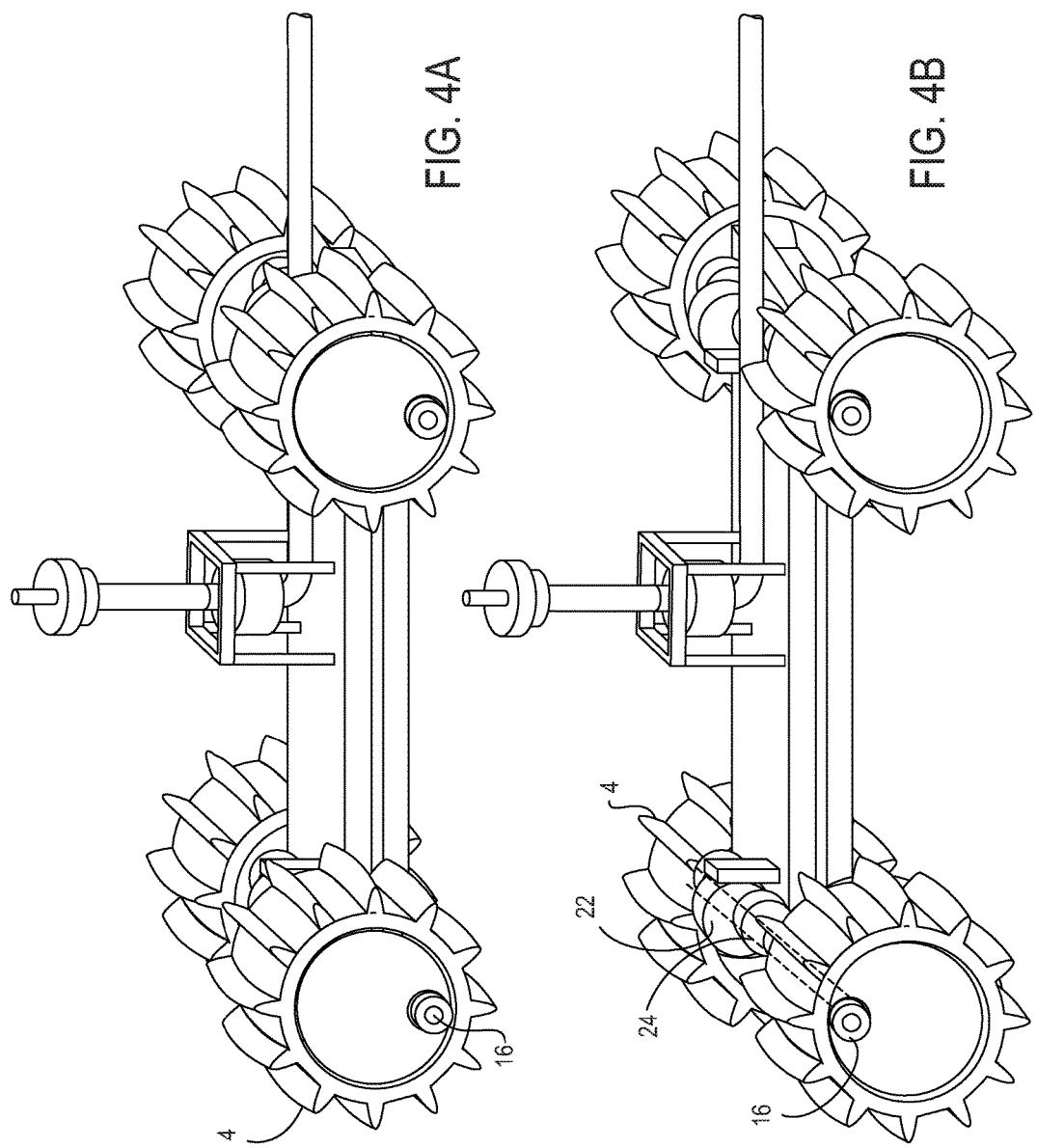

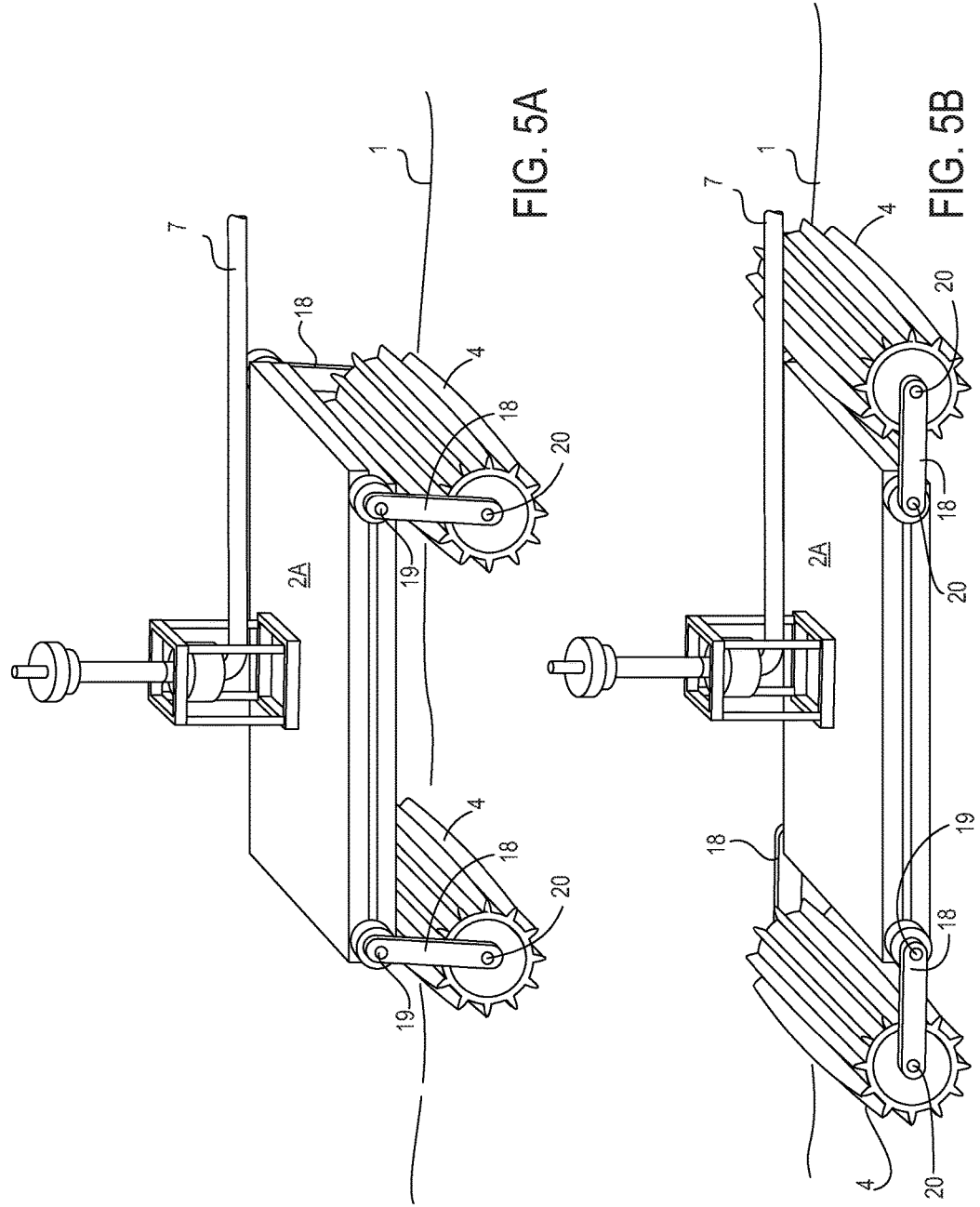

APPARATUS AND METHOD FOR REDUCING IMPACT OF STRESSES ON A SUBSEA PIPELINE

FIELD

The present disclosure relates to apparatus and methods for reducing stress in a subsea conduit on a seabed such as an offshore hydrocarbon production pipeline. The present disclosure further relates to pipeline end and inline termination equipment for supporting a subsea pipeline.

BACKGROUND

Subsea pipeline is used for oil and gas production, for transporting produced fluids from offshore oil and gas reservoirs, as well as for transporting fluids such as gas and water to be injected into offshore reservoirs. Pipeline in offshore oil and gas production is installed on the seabed, often spanning great distances. Hydrocarbon well fluids carried by such pipelines can occur at high temperatures, e.g., greater than about 80° C., even up to about 165° C. Pipeline carrying such high temperature fluids can experience thermal gradients across the pipeline during multiple production shut downs and startups resulting in stresses associated with expansion, contraction, and thermal cycling of the pipeline. This can result in pipeline buckling, movement, and loading that lead to both static peak and cyclic stresses, which may induce overstrain and fatigue failures along the length of the pipeline at locations which are relatively vulnerable and prone to these failure mechanisms. Subsea pipeline transmitting high-temperature fluids, also herein referred to as high temperature pipeline, particularly during shutting down and restarting cycles, is subject to pipeline "walking" in which the pipeline moves away from its intended location. If not mitigated, pipeline walking can lead to failure of subsea pipeline system components such as jumpers, subsea structures and risers. To maintain pipeline system integrity in high temperature pipelines in deepwater oil and gas fields, pipeline end terminations (PLETs) are typically constructed with a sliding mechanism that allows the end of the pipeline to slide back and forth on a fixed foundation so that thermal expansion of the pipeline can be accommodated. This often results in very large, costly PLET structures. As the magnitude of the thermal expansion grows, so does the size and complexity of the PLET design. Very large mud mats are frequently required, e.g., on the order of 60-90 feet long. Very large suction piles installed in the seabed are also frequently used for anchoring the PLET on the seabed. For example, such suction piles can be over 15 feet in diameter and 80-100 feet in length. Larger structures often result in challenges during installation and may require larger installation vessels or increased installation time which result in tremendous additional cost.

It would be desirable to have a solution to the above problems which would control buckling of subsea pipeline, reduce the incidence of pipeline walking, and reduce the need for pipeline anchoring. There is a great economic need for a simpler way to accommodate subsea pipeline stresses and reduce equipment and installation costs.

SUMMARY

In one aspect, the disclosure relates to an apparatus for supporting a portion of a subsea pipeline over a seabed in response to stresses on the pipeline. The portion of the subsea pipeline can be an end of the subsea pipeline or a portion of the subsea pipeline along the length thereof. The subsea pipeline is used for transmitting produced fluids during oil or gas production produced from a subterranean reservoir or for transmitting water or gas to be injected into a subterranean reservoir. The apparatus includes a rigid support structure for supporting the portion of the subsea pipeline thereon. Rotatable components are attached to the rigid support structure for rotating over the seabed. Each rotatable component is rotatable about an axle attached to the rigid support structure.

In another aspect, the disclosure generally relates to a method for supporting the portion of the subsea pipeline over the seabed. The method includes positioning and attaching the portion of the subsea pipeline on the upper surface of the rigid support structure of the apparatus and positioning the rigid support structure over the seabed. Axial movement, lateral movement and combinations thereof in the subsea pipeline thereby result in movement of the rigid support structure over the seabed.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

FIG. 3 is a view of an apparatus for supporting at least a portion of a subsea pipeline over a seabed in which rotatable components can be raised and lowered via hinged linkages.

FIGS. 4A and 4B are views of an apparatus for supporting at least a portion of a subsea pipeline over a seabed in which rotatable components can be raised and lowered via eccentric hubs.

FIGS. 5A and 5B are views of another apparatus for supporting at least a portion of a subsea pipeline over a seabed in which rotatable components can be raised and lowered via hinged linkages.

DETAILED DESCRIPTION

The present disclosure provides apparatus and methods for controlling deformation or buckling of a subsea pipeline, by which is meant a pipeline that is located on a seabed.

Figure 1:
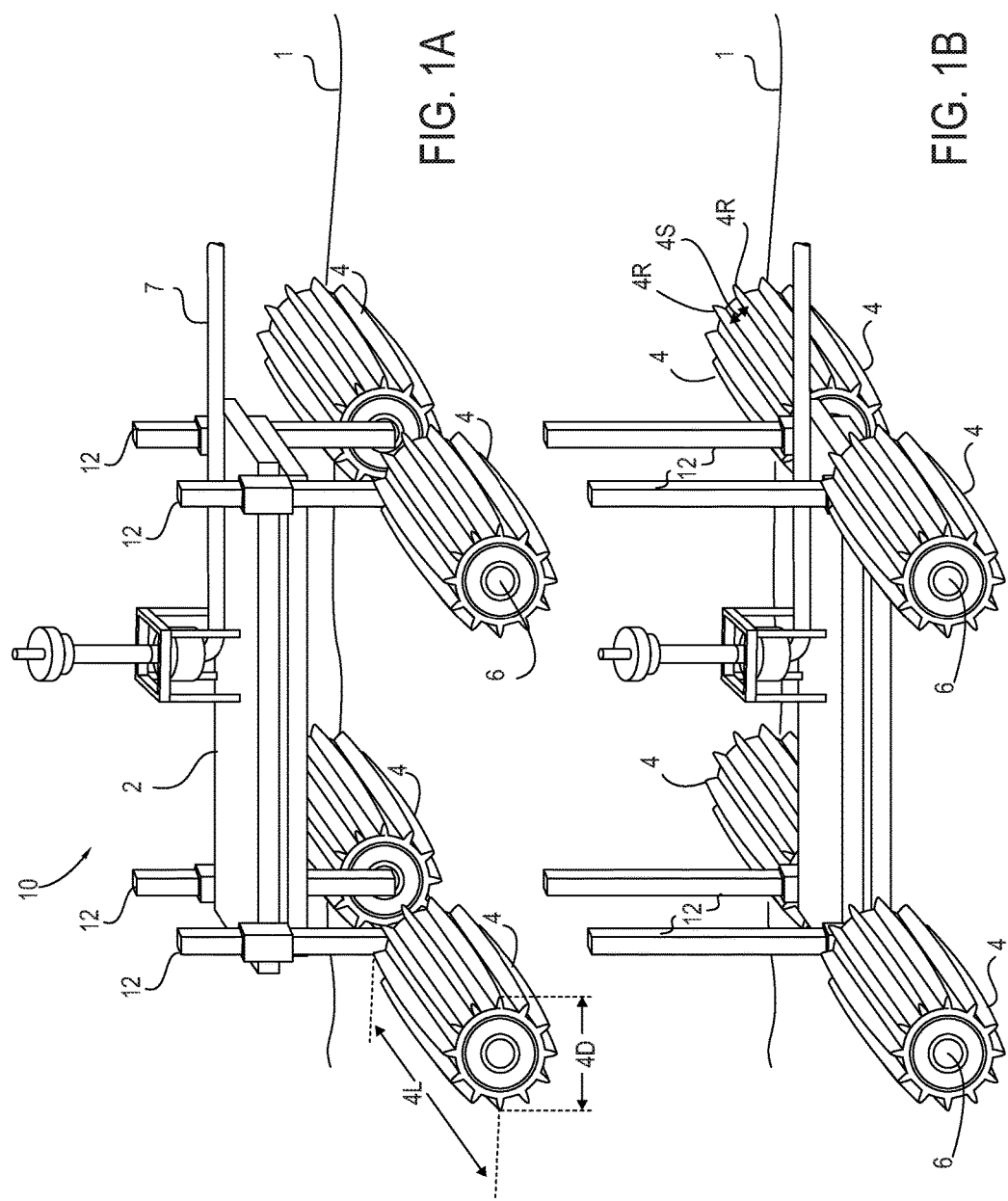
FIGS. 1A and 1B are views of an apparatus for supporting at least a portion of a subsea pipeline over a seabed in which a support structure is raised and lowered with respect to rotatable components, respectively.

Referring to FIGS. 1A and 1B, an apparatus 10 for supporting at least a portion of a subsea pipeline 7, also referred to as a pipeline 7, over a seabed 1 is illustrated. The subsea pipeline can be used for transmitting produced fluids (e.g., oil, gas, water) produced from a subterranean reservoir or for transmitting water or gas to be injected into a subterranean reservoir during oil or gas production. The portion of the subsea pipeline 7 can be an end of the subsea pipeline or a portion of the subsea pipeline along the length thereof.

A rigid support structure 2, also referred to as a support structure 2, is provided to support the portion of the subsea pipeline thereon. The rigid support structure 2 has an upper surface 2A. In one embodiment, the rigid support structure 2 is referred to as pipeline end termination (PLET) foundation 2 when the portion of the subsea pipeline being supported is an end of the subsea pipeline. A pipeline end connector (not shown) can be provided at the end of the pipeline for establishing fluid connection between the subsea pipeline and a secondary fluid line, e.g., another section of pipe, a jumper, riser, etc. In one embodiment, the rigid support structure 2 is referred to as an inline skid (ILS) 2 when the portion of the subsea pipeline being supported is a portion of the subsea pipeline along the length thereof. In some embodiments, at least one cradle (not shown) can be provided on the upper surface 2A for directly supporting the portion of the pipeline 7.

In one embodiment, a plurality of rotating mechanisms is attached to the rigid support structure 2. By "rotating mechanism" is meant an assembly of components including rotatable components 4 and accessories necessary for the functioning of the individual rotatable components 4, e.g., axles 6 about which each rotatable component 4 rotates. The rotating mechanisms allow the rigid support structure 2 to move on the seabed 1 to accommodate axial movement of the pipeline 7. Each rotating mechanism has a substantially rotatable component 4 for rotating over the seabed 1 having a substantially circular cross-section, a diameter 4D and a length 4L. In some embodiments, rotatable components 4 are configured to be mounted onto an axle 6 which is rotatable with respect to the axle 6, such that rotation of the rotatable component facilitates lateral movement of the rigid support structure 2. In some embodiments, the rotatable components can have a diameter 4D of from 0.5 ft to 5 ft and a length 4L of from 0.5 ft to 2 ft.

In some embodiments, the rotatable components 4 can be provided with elongated circumferentially spaced grooves or elongated ridges to provide traction when the rotatable components rotate in contact with the seabed 1, e.g., soft soil. In the embodiment shown, each of the rotatable components 4 has a plurality of ribs 4R spaced a distance of 4S from one another along the circumference of the rotatable component 4. The plurality of ribs 4R enable the rotatable components 4 to effectively move over the surface of the seabed 1.

The rotatable components 4 can be formed from any suitable material, including, but not limited to, polyethylene, polypropylene, nylon, composite material and low friction material. Nonlimiting examples of suitable low friction materials include polytetrafluoroethylene (PTFE), fluorinated ethylene propylene, perfluoroalkoxy, polyethylene, silicone, modified fluoropolymer, polyetheretherketone and polyetherketone. The rotatable components 4 can be buoyant, neutrally buoyant or weighted. Buoyant materials may be used including foams such as polyurethane or polypropylene syntactic foam and the like.

From 2 to 100 rotatable components 4 can be attached to the rigid support structure 2. In one embodiment, as shown, four rotatable components 4 are attached to the rigid support structure 2. In other embodiments, six, eight or ten rotatable components 4 may be used. In one embodiment, the plurality of rotating mechanisms includes at least two axles 6. Each axle 6 is attached to the rigid support structure 2 and can be oriented between the lateral sides of the rigid support structure 2. Each substantially rotatable component 4 rotates about one of the at least two axles 6 proximate one of the ends of the axle 6.

In some embodiments, a reversible extension mechanism 12 is used for reversibly extending and retracting the rotatable components 4 relative to the rigid support structure 2, to raise and lower the support structure 2, respectively. In one embodiment, the reversible extension mechanism 12 is a plurality of vertical rails attached to the rotatable components 4 that can pass vertically through a channel mounted to the support structure 2. In one embodiment, the reversible extension mechanism 12 is a plurality of threaded jack bolts attached to the rotatable components 4 for raising the rotatable components 4 with respect to the support structure 2, thereby enabling the rotatable components 4 to be lowered from a retracted position above the rigid support structure 2 to an extended position protruding below the rigid support structure 2. In one embodiment, the reversible extension mechanism 12 is a plurality of hydraulic jacks attached to the rotatable components 4 and to the support structure 2, thereby enabling the rotatable components 4 to be lowered from a retracted position above the rigid support structure 2 to an extended position protruding below the rigid support structure 2. In one embodiment, the reversible extension mechanism 12 is a plurality of telescoping rods each rod having a rod length locking mechanism by which the rotatable components 4 are attached to the rigid support structure 2, thereby enabling the rotatable components 4 to be lowered from a retracted position above the rigid support structure 2 to an extended position protruding below the rigid support structure 2.

FIG. 1A shows the apparatus in an elevated position in which the support structure 2 is elevated with respect to the rotatable components 4 and in a position to move over the seabed 1. FIG. 1B shows the apparatus in a lowered position in which the support structure 2 is not in a position to be moved over the seabed 1. The elevated position can be used during the hydrocarbon production when fluids are passing through the pipeline 7. The lowered position can be used whenever it would not be desirable for the support structure 2 to move, such as when the apparatus 10 is being installed prior to hydrocarbon production through the pipeline 7. At least one removeable temporary weight (not shown) can optionally be used to maintain the apparatus 10 in a stationary position during installation.

Figure 2:
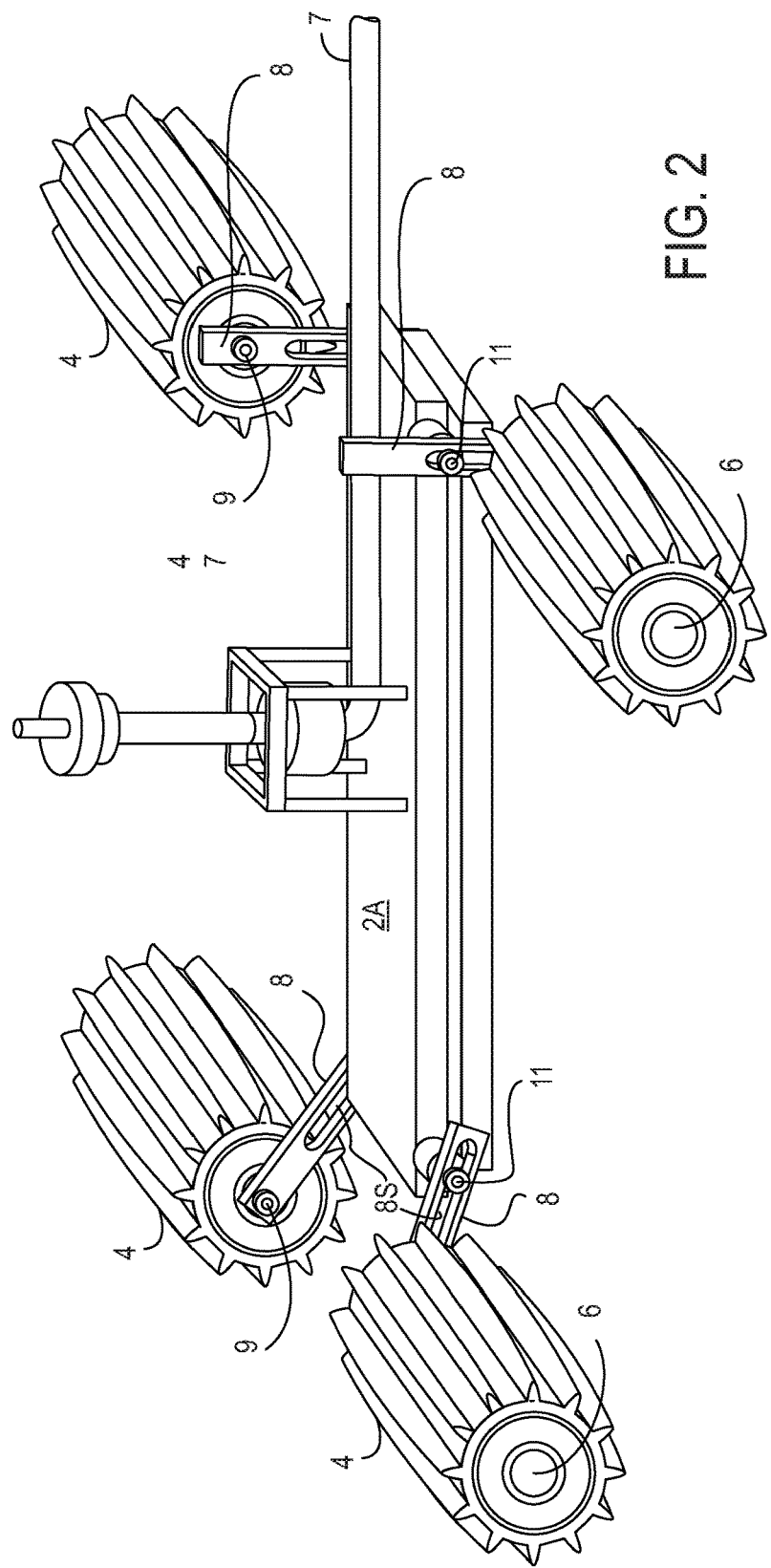
FIG. 2 is a view of an apparatus for supporting at least a portion of a subsea pipeline over a seabed in which rotatable components can be positioned variously as shown.

In one embodiment, illustrated in FIG. 2, the reversible extension mechanism utilizes a hinge by which the rotatable components 4 are attached to the rigid support structure 2, thereby enabling the rotatable components 4 to swivel between a retracted position above the rigid support structure 2 to an extended position protruding below the rigid support structure 2. In the embodiment shown, rotatable components 4 are connected to the support structure 2 using linkages 8 that are connected to the rotatable components 4 at point 9, and to the support structure 2 by an adjustable bolt 11. In one embodiment, the linkages 8 are slotted, so that the bolt 11 can be positioned at a desired point along slot 8S in the linkage 8, thus adjusting the effective distance between the support structure 2 and the axles 6 of the rotatable components 4.

In one embodiment, illustrated in FIG. 3, when in the retracted position, the substantially circular cross-section of each of the rotatable components 4 is in a substantially horizontal plane substantially parallel to the rigid support structure 2, and in the extended position, the substantially circular cross-section of each of the rotatable components 4 is in a substantially vertical plane substantially perpendicular to the rigid support structure 2. The substantially circular cross-section of each of the rotatable components 4 can be in a substantially vertical plane substantially perpendicular to the rigid support structure 2 in both the retracted and extended positions (not shown). The hinge in the embodiment shown occurs at point 15, where linkage 14 is attached to the support structure 2. The linkage 14 connects the rotatable components 4 to the support structure 2.

Referring to FIGS. 4A and 4B, in one embodiment, each rotatable component 4 has a geared inner surface (not shown) for engaging a geared hub 16. The geared hub 16 can be caused by a motor 22 driving an axle 24 to rotate eccentrically thereby causing the support structure 2 to raise and lower with respect to the seabed 1.

Referring to FIGS. 5A and 5B, in one embodiment, each rotatable component 4 has an elongated cylinder shape, also referred to as a cylinder, for rotating over the seabed 1 having a substantially circular cross-section, a diameter and a length. The rotatable cylinders 4 can have a diameter of from 0.5 ft to 5 ft and a length of from 0.5 ft to 30 ft. In one embodiment, two rotatable cylinders 4 are attached to the rigid support structure 2 and rotate about one of the at least two 20. Three, four or five rotatable cylinders 4 could also be used.

In one embodiment, a displacement sensor (not shown) can be used for monitoring displacement of the rotatable components 4. The displacement of the rotatable components 4 can be monitored using a series of markings along the circumference of at least one of the rotatable components 4 for measuring distance covered by the rotatable component 4 during rotation. Alternatively, a counter can be used to count the rotations of the rotatable components 4. In another embodiment, a global positioning satellite (GPS) tracking device can be located on the apparatus 10 to monitor the displacement of the rotatable components 4.

In some embodiments, an intermediate structure can be located between the seabed 1 and the rotatable components 4 to facilitate the rotation of the rotatable components 4. The intermediate structure can be a substantially planar mat(s) and/or a gravel surface. Alternatively, a track can be located between the seabed 1 and the rotatable components 4 of the apparatus 10 for engaging with the rotatable components 4 such that the rotatable components 4 are restricted to rotating along the track.

In one embodiment, a method for supporting at least a portion of the subsea pipeline 7 over a seabed 1 includes, in no particular order, positioning and attaching the portion of the pipeline 7 on the upper surface 2A of the rigid support structure 2 of the apparatus 10, and positioning the rigid support structure 2 over the seabed 1. Axial movement and/or lateral movement in the pipeline 7 therefore result in movement of the apparatus 10 over the seabed 1.

The presently disclosed apparatus and method is a practical and cost-effective solution in subsea systems with high risk of pipeline end expansion and walking. There are at least a few significant benefits of the presently disclosed apparatus and method. These include the ability to reduce the size of the pipeline end termination mud mat structure significantly, e.g., by more than 100%. Installation time associated with installation of the pipeline end termination structure can be greatly reduced by installing the apparatus 10 in one rather than two separate installations. Capital expense can be greatly reduced by eliminating the need for fabrication and installation of additional ancillary components such as holdback anchors.

To illustrate the advantages of the present method over conventionally known and practiced methods, a 40 km subsea pipeline was considered. Analyses of the 40 km pipeline showed the pipeline would be subjected to an expansion of approximately 1.5 m, and the repeated cycles of thermal expansion and contraction due to the platform restarts and shut ins would result in walking on the order of 10 m. Because of this, only two conventionally practiced methods could be realistically considered to solve the problems of expansion and pipeline walking.

For one, the pipeline could be restrained by anchoring it using many large suction piles. This was determined to be a prohibitively expensive option.

As another option, a standard PLET system was considered to accommodate the expansion of 1.5 m and the walking of 10 m. If a standard PLET mud mat with a total length on the order of 30 ft were used, the walking and expansion cycles would lead to the PLET digging into the soil, therefore leading to buckling of the pipeline near the PLET. For this reason, the standard PLET solution was eliminated. In order to design a feasible PLET system, the size of the mud mat was significantly increased to about 80 ft. This large mud mat could not be installed through the standard installation procedures by the installation vessel. The mud mat was first installed separately and the PLET piping was installed from the vessel to land on the mud mat structure. This increase in subsea structure size and the complexity of the installation led to an increase in cost on the order of tens of millions of dollars.

Using the presently disclosed method, the standard PLET of total length in order of 30 ft would be feasible because the PLET would have specialized rotatable components that would allow the PLET to move efficiently without digging into the soil. The presently disclosed method and apparatus greatly facilitate installation and significantly reduce fabrication complexity and cost. Advantageously, use of the presently disclosed method and apparatus eliminates the need for a mud mat or a suction pile to accommodate movement in the subsea pipeline as is conventionally required.

It should be noted that only the components relevant to the disclosure are shown in the figures, and that many other components normally part of pipeline end termination or inline termination equipment are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference. From the above description, those skilled in the art will perceive improvements, changes and modifications, which are intended to be covered by the appended claims.

What is claimed is:

1. An apparatus for supporting at least a portion of a subsea pipeline over a seabed, the apparatus comprising:
   a. a rigid support structure having a front side, a rear side, two lateral sides, an upper surface, a lower surface and a width, for supporting the portion of the subsea pipeline thereon; and
   b. a plurality of rotating mechanisms attached to the rigid support structure, wherein each rotating mechanism comprises a rotatable component for rotating over the seabed having a substantially circular cross-section and a length and wherein each rotatable component is rotatable about an axle attached to the rigid support structure;
   wherein the portion of the subsea pipeline comprises an end of the subsea pipeline or a portion of the subsea pipeline along a length of the subsea pipeline; and
   wherein the subsea pipeline is used for transmitting produced fluids during oil or gas production produced from a subterranean reservoir or for transmitting water or gas to be injected into a subterranean reservoir;
   wherein the plurality of rotating mechanisms comprises:
   at least two axles wherein each axle:
   has two ends;
   is oriented in the direction between the two lateral sides of the rigid support structure; and
   is attached to the rigid support structure by a linking member such that the at least two axles are attached below the rigid support structure; and
   at least four rotatable components wherein each rotatable component is substantially and is rotatable about one of the at least two axles proximate one of the ends of the axle.

2. The apparatus of claim 1 wherein the plurality of rotating mechanisms further comprises a reversible extension mechanism for extending and retracting the rotatable components relative to the lower surface of the rigid support structure.

3. The apparatus of claim 2 wherein the reversible extension mechanism comprises a hinge by which the rotatable components are attached to the rigid support structure thereby enabling the rotatable components to swivel from a retracted position above the lower surface of the rigid support structure to an extended position protruding below the lower surface of the rigid support structure.

4. The apparatus of claim 3 wherein in the retracted position, the substantially circular cross-section of each of the rotatable components is in a substantially horizontal plane substantially parallel to the lower surface of the rigid support structure, and in the extended position, the substantially circular cross-section of each of the rotatable components is in a substantially vertical plane substantially perpendicular to the lower surface of the rigid support structure.

5. The apparatus of claim 3 wherein the substantially circular cross-section of each of the rotatable components is in a substantially vertical plane substantially perpendicular to the lower surface of the rigid support structure in both the retracted and extended positions.

6. The apparatus of claim 2 wherein the reversible extension mechanism comprises a threaded jack bolt by which the rotatable components are attached to the rigid support structure thereby enabling the rotatable components to be lowered from a retracted position above the lower surface of the rigid support structure to an extended position protruding below the lower surface of the rigid support structure.

7. The apparatus of claim 2 wherein the reversible extension mechanism comprises a hydraulic jack by which the rotatable components are attached to the rigid support structure thereby enabling the rotatable components to be lowered from a retracted position above the lower surface of the rigid support structure to an extended position protruding below the lower surface of the rigid support structure.

8. The apparatus of claim 2 wherein the reversible extension mechanism comprises a telescoping rod having a rod length locking mechanism by which the rotatable components are attached to the rigid support structure thereby enabling the rotatable components to be lowered from a retracted position above the lower surface of the rigid support structure to an extended position protruding below the lower surface of the rigid support structure.

9. The apparatus of any of claims 6-8 wherein the reversible extension mechanism further comprises a hinge by which the rotatable components are attached to the rigid support structure thereby enabling the rotatable components to swivel from the retracted position to the extended position.

10. An apparatus for supporting at least a portion of a subsea pipeline over a seabed, the apparatus comprising:
    a. a rigid support structure having a front side, a rear side, two lateral sides, an upper surface, a lower surface and a width, for supporting the portion of the subsea pipeline thereon; and
    b. a plurality of rotating mechanisms attached to the rigid support structure, wherein each rotating mechanism comprises a rotatable component for rotating over the seabed having a substantially circular cross-section and a length and wherein each rotatable component is rotatable about an axle attached to the rigid support structure;
    wherein the portion of the subsea pipeline comprises an end of the subsea pipeline or a portion of the subsea pipeline along a length of the subsea pipeline; and
    wherein the subsea pipeline is used for transmitting produced fluids during oil or gas production produced from a subterranean reservoir or for transmitting water or gas to be injected into a subterranean reservoir; wherein the plurality of rotating mechanisms comprises:
    at least two axles wherein each axle:
    has two ends;
    is oriented in the direction between the two lateral sides of the rigid support structure; and
    is attached to the rigid support structure by a linking member such that the at least two axles are attached below the rigid support structure; and
    at least two rotatable components wherein each rotatable component is substantially cylinder-shaped and is rotatable about one of the at least two axles.

11. The apparatus of claim 1 or claim 10 wherein the apparatus comprises from 2 to 100 rotatable components.

12. The apparatus of claim 1 or claim 10 further comprising the portion of the subsea pipeline supported on the rigid support structure wherein the portion of the subsea pipeline is the end of the subsea pipeline, further comprising an end connector attached to the end of the subsea pipeline for establishing fluid connection between the subsea pipeline and a secondary fluid line.

13. The apparatus of claim 1 wherein the rotatable components have a diameter from 0.5 ft to 5 ft and the length of the rotatable components is from 0.5 ft to 2 ft.

14. The apparatus of claim 1 or claim 10 wherein each of the rotatable components comprises a plurality of circumferentially spaced grooves to provide traction when the rotatable components rotate in contact with the seabed.

15. The apparatus of claim 10 wherein the rotatable components have a diameter from 0.5 ft to 5 ft and the length of the rotatable components is from 0.5 ft to 30 ft.

16. A method for supporting at least a portion of a subsea pipeline over a seabed, comprising, in no particular order:
 a. positioning and attaching the portion of the subsea pipeline on the upper surface of the rigid support structure of the apparatus of claim 1 or claim 10; and
 b. positioning the rigid support structure over the seabed; such that axial movement, lateral movement and combinations of axial and lateral movement in the subsea pipeline result in movement of the rigid support structure over the seabed.

17. The method of claim 16 wherein the method is conducted in the absence of a mud mat or a suction pile to accommodate movement in the subsea pipeline.

18. The method of claim 16 wherein the subsea pipeline is used for transmitting produced fluids during oil and/or gas production or transmitting water or gas for subterranean injection.

* * * * *